United States Patent Office 3,479,264
Patented Nov. 18, 1969

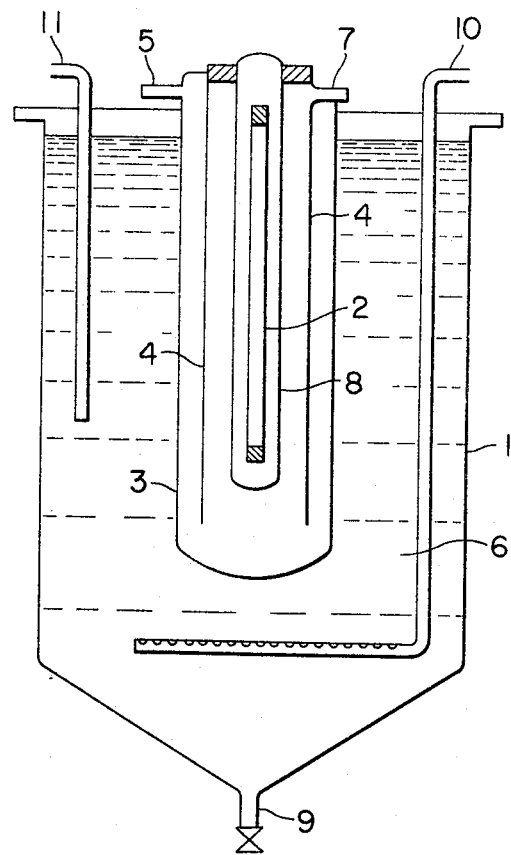

3,479,264
METHOD OF PHOTONITROSATION OF CYCLOALKANE
Yoshikazu Ito, Mizuho-ku, Nagoya, Shigeru Wakamatsu, Midori-ku, Nagoya, Yoichiro Hara, Minami-ku, Nagoya, and Jiro Morino, Shijyomachi, Nagoya, Japan, assignors to Toyo Rayon Kabushiki Kaisha, Tokyo, Japan, a corporation of Japan
Filed Apr. 28, 1965, Ser. No. 451,481
Int. Cl. B01j 1/10
U.S. Cl. 204—162                      4 Claims

ABSTRACT OF THE DISCLOSURE

An improved process for the photonitrosation of cycloalkanes which comprises reacting a cycloalkane with a form of nitrosyl chloride under the irradiation of a thallium lamp in which a thallium halide is enclosed. The process allows for an improved yield of product unit of electric power with the checking of the formation of significant by-products.

---

This invention relates to a method of photonitrosation of cycloalkane with which reaction can be continued stably for a long time to give an improved yield (per unit electric power) and with which the formation of insignificant by-products can be markedly checked. Particularly, it relates to a method of photonitrosation of cycloalkane which comprises reacting cycloalkane with a nitrosating agent under the irradiation of light to form the corresponding cycloalkanoneoxime hydrochloride (hereinafter sometimes abbreviated simply as oxime), characterized in that nitrosyl chloride is caused to be present in the reaction system at a high concentration and a thallium lamp is used as a source of light.

More particularly, the invention relates to a method of photonitrosation which is characterized in that, in said known method, the amount of nitrosyl chloride present in the reaction system is adjusted to a high concentration of 0.15 to 0.8% based on the weight of the reaction system, that thallium halide enclosed in the thallium lamp is preferably thallium iodide and that as a light source there is used a thallium lamp in which thallium iodide is filled at a low concentration in an amount of less than 1.5 mg./cc. (the cc. showing 1 cubic centimeter in which thallium iodide is filled), preferably in the range of 1 mg./cc. to 0.01 mg./cc., the range of 0.1 to 0.05 mg./cc. being particularly preferred.

Heretofore, in the photonitroso reaction of cycloalkane, a mercury lamp, preferably a high pressure mercury lamp, is used as a light source, and reaction is carried out by introducing a nitrosating agent in various forms under the irradiation of light.

In such photonitrosating reaction, the occurrence of side reactions and the formation and deposition of a brown tarry substance (to be referred to as "soil") on a transparent partition placed between the light source and the photonitroso reaction system, for instance on the surface of the glass, the unavoidable. Owing to this phenomenon, the reaction gets slackened with the lapse of time and it becomes impossible to continue a stable photonitroso reaction for a prolonged time.

The yield of oxime per unit electric power is 2.0 mol kwh. at most. When the concentration of nitrosyl chloride in the reaction system exceeds about 0.2% by weight, more adverse side reactions occur increasingly and a stable photonitroso reaction cannot be maintained, which results in a lowered yield and quality of the oxime.

Many attempts have heretofore been made in order to overcome commercial disadvantages resulting from the occurrence of such side reactions or from soils, but still further improvements are desired.

As a result of an extensive research into a method by which commercial disadvantages in the prior art processes can be overcome and a stable photonitroso reaction can be carried out for a prolonged time with a higher yield per unit electric power, we have found that by using a thallium lamp as a light source the yield of oxime per unit power is tremendously increased and a stable photonitroso reaction can be carried out for about two to three times as much time under the same conditions as compared with the prior art processes in which a mercury lamp, a high pressure mercury lamp or a fluoroescent mercury, etc., is used as a light source.

We have also found that at a nitrosyl chloride concentration such that remarkably pronounced side reactions are facilitated by the use of the above-mentioned mercury lamps, a stable photonitroso reaction can be carried out for a prolonged time to give excellent yield per unit power and excellent quality of the obtained oxime.

It has also come to our knowledge that the increase of the yield and the prolonged time of the reaction stability can be achieved under the same conditions not only in the range of 0.03 to 0.2% by weight, which is a concentration of nitrosyl chloride in the reaction system employed in the conventional photonitroso reaction of cycloalkane but also in the concentration of more than 0.25% by weight which is disadvantageous in the prior art processes.

Another of our discoveries is that such effects are more remarkable when a concentration of nitrosyl chloride in the reaction system exceeds 0.15% by weight, preferably from 0.25 to 0.8% by weight, especially preferably in the range of about 0.25 to 0.5% by weight, and thus there is obtained about 1.5 to 2.3 times as much producibility as compared with the prior art processes.

Especially, the increased yield of oxime per unit power and a remarkable prolongation of the time during which reaction can be carried out stably are quite an unexpected outcome, and it had not been anticipated that reaction is effected advantageously even in the presence of nitrosyl chloride having a concentration in the range which has been disadvantageous in the prior art processes.

It is also our finding that by using a thallium lamp having a very small amount of thallium iodide filled therein as compared with the amount of thallium iodide heretofore filled in the thallium lamp in the reaction system in which nitrosyl chloride is present at such a high concentration as have been regarded as being commercially disadvantageous in the past, the marked improvement in the yield of oxime per unit power, reaction stability for a prolonged time and the prevention of the formation of insignificant by-products can be achieved.

Accordingly, a primary object of this invention is to provide a method of carrying out the photonitroso reaction of cycloalkane advantageously on a commercial basis using especially a thallium lamp as a light source, which results in a hitherto unexpected remarkably improved yield of oxime per unit power, the reaction stability for a prolonged time and the prevention of the formation of unfavourable by-products.

The secondary object of this invention is to provide a method of the photonitrosation of cycloalkane by which not only improved results can be obtained even at a concentration of the hitherto used range of nitrosyl chloride in the reaction system, but also at a higher concentration which has rather been avoided hitherto more markedly improved yield of oxime per unit power can be obtained.

The third object of this invention is to make clear the suitable range of said concentration and the concentration (g./cc.) of thallium iodide to be filled in the thallium lamp and to make clear the commercially advantageous photonitroso reaction of cycloalkane.

Many other objects and advantages of this invention will become more apparent by the following descriptions.

When a thallium lamp is used in accordance with this invention, the time during which reaction can be stably effected is prolonged to the hitherto unexpected degree, the concentration of nitrosyl chloride in the reaction system can be markedly increased as compared with the use of the mercury lamps in the prior art processes and at a high concentration range which has hitherto been disadvantageous, the yield of oxime per unit power is increased. The cause of these remarkable improvements is not clear, but it is assumed that these improvements have to do with a possible influence upon the rate of the formation of "soils" of the subtle difference in the composition of the light in a source.

The thallium lamp used in accordance with the method of this invention is a discharge tube in which thallium or a thallium compound is filled as a discharge medium, and this discharge tube may contain at the same time such substances as argon, neon, xenon, indium iodide, sodium iodide, and mercury in order to facilitate the initiation of discharge.

The amount of thallium to be enclosed and the vapor pressure of the enclosed substance at the time of discharge are variable. Especially preferable is a thallium lamp which is filled with thallium halide especially thallium iodide. It is preferable that mercury is caused to be present in such thallium lamp for the ease of the initiation of discharge.

Furthermore, we have made an unexpected discovery that when in this invention the concentration of nitrosyl chloride in the reaction system is elevated and there is used a thallium lamp in which thallium iodide is enclosed at a low concentration of less than 1.5 mg./cc., preferably in the range of 1 to 0.1 mg./cc., especially preferably 0.1 to 0.05 mg./cc. despite the fact that hitherto the amount of thallium iodide to fill the thallium lamp has had to be at least 1.5 mg. per 1 cc. of the space to be filled, reaction can be more advantageously carried out.

In the method of this invention, photoreaction can be carried out in accordance with the hitherto known method but with the use of a thallium lamp. By carrying out a reaction at a nitrosyl chloride concentration in the range of 0.15 to 0.8% by weight, more preferably from 0.2 to 0.8% by weight and more advantageously from about 0.25 to 0.5% by weight, the yield of oxime per unit power can be further increased.

The method in accordance with this invention can generally be utilized in the photonitroso reaction of cycloalkane.

Cyloalkane, for instance cyclohexane, cyclooctane, cyclododecane, etc., is particularly of commercial importance as a raw material of polyamide, it being not restricted by the number of its carbon atoms. A solution of cycloalkane in other inert solvent or a mixture of more than two cycloalkanes may be used. Examples of the nitrosating agent are such known agents as nitrosyl chloride, a gaseouss mixture of nitrosyl chloride and hydrogen chloride, a gaseous mixture of nitrogen monoxide and chlorine, a gaseous mixture of nitrogen monoxide, chlorine and hydrogen chloride, a gaseous mixture of nitrose gas and chlorine, and a gaseous mixture of nitrose gas, chlorine and hydrogen chloride.

Any of these nitrosating agents acts as nitrosyl chloride in the photoreaction system, and this invention is not limited whatsoever by the form of such nitrosating agent to be fed.

The reaction may be carried out either by batchwise process or by a continuous process, but of course the continuous process is commercially advantageous. The utilizable size and shape of the reaction tank and the light source are those hitherto known. The cooling of the light source may be carried out in the same manner as hitherto known.

The reaction temperature employed is in the known range, usually $-20°$ to $50°$ C., the temperature in the range of $10°$ to $20°$ C. being especially preferred.

The photoreaction of cycloalkane is carried out by using a mercury lamp with the concentration of nitrosyl chloride in the reaction system adjusted to the range of 0.1 to 0.2% by weight which is suitable for obtaining the good yield of oxime by the use of any of mercury lamps, and the method of this invention is practised under the same conditions but with the concentration of nitrosyl chloride adjusted to 0.25 to 0.5% by weight which is similarly suitable when a thallium lamp is used as a light source. Then, it was found that the yield of oxime per unit power in this invention increases by from about 50% to as high as about 100% as compared with the yield obtained by conventional method.

Furthermore, such discharging lamp as fluorescent lamp, xenon lamp and iodine lamp can be a light source for nitroso reaction. However, all of these have less capability of producing oxime as compared with said mercury lamp and because of small density of light, they have a disadvantage when industrially used.

It is generally known that the higher the concentration of nitrosyl chloride in the photoreaction system is, the greater the rate of the formation of "soils" becomes. Experiments in which cyclohexane is used as cycloalkane show that the time during which photoreaction could be continued stably when the concentration of nitrosyl chloride in the photoreaction zone is 0.3% by weight is 15 to 20 hours for mercury lamps while it reached 45 hours in this invention in which a thallium lamp is used. By the "time during which photoreaction can be continued stably" used here is meant a time from the initiation of the reaction to a point where the yield of oxime per unit power is lowered to 80% of that at the early stage of the reaction, and it is hereafter to be referred to as a "stable time."

With the increase of the concentration of nitrosyl chloride in the reaction system, the rate of the formation of soils becomes more rapid and the stable time is prone to decrease. This is the same with the thallium lamp. Our research has revealed that when the thallium lamp is used, even at the concentration of nitrosyl chloride in the photoreaction system being 0.8% by weight, the stable time reaches 25 hours and as compared with the use of mercury lamps, a more excellent stability of reaction can be obtained at such high concentration.

Generally in the photonitroso reaction of cycloalkane, there is observed a tendency that a longer stable time brings about a better quality of the resulting oxime with small amount of impurities. Such phenomenon is the same when a thallium lamp is used. Therefore, when a thallium lamp is used even if the concentration of nitrosyl is relatively high, the resulting oxime has a good quality. The relationship between the concentration of nitrosyl chloride in the reaction system and the quality of oxime at the time of preparation of cyclohexanoneoxime from cyclohexane by photonitroso reaction is shown in Table 1 in respect of a high pressure mercury lamp and a thallium lamp.

TABLE 1

| Concentration of nitrosyl chloride (Percent by weight) | PMV of distilled lactam (second) | |
|---|---|---|
|  | Mercury lamp | Thallium lamp |
| 0.1 | 120 | 125 |
| 0.3 | 50 | 120 |
| 0.5 | 10 | 110 |
| 0.8 | <10 | 95 |

The valuation of the quality of oxime is made as follows. Oxime is subjected to Beckmann's rearrangement by means of sulphuric acid to give ε-caprolactam (abbreciated as lactam). The sulphuric acid mingled with said lactam is neutralized with an aqueous ammonium solution and removed. The water content in the crude lactam is removed by simple distillation. The obtained anhydrous crude lactam is distilled under reduced pressure on addition of a small amount of caustic soda to form distilled lactam. The presence of reducible impurities in this distilled lactam is known by the rate (pmv.) at which potassium permanganate added to said lactam is consumed. Therefore, the greater the value of pmv. is, the better the quality of the lactam becomes. From the above given Table 1, it is known that the quality of the oxime obtained in accordance with the method of this invention is more improved as compared with the prior art processes.

It is known that when a metallic titanium is used for the reaction apparatus for photonitroso reaction of cycloalkane, the presence of light facilitates the corrosion of the metallic titanium in the photoreaction system. However, in accordance with the method of this invention the corrosion of the metallic titanium can be inhibited.

There are many hitherto proposed improvements such as a method for washing a deposited tarry substance off with sulphuric acid, method for removing ultraviolet rays irradiated from a light source, a method for making great excess of hydrogen chloride present in nitrosation. These improved methods may be used jointly with this invention.

As so far mentioned, in accordance with the method of this invention, it is possible to tremendously increase the yield of oxime per unit power consumed in the reaction, to inhibit the formation of an opaque brown tarry substance deposited on the surface of a transparent partition, for instance a sheet of glass, provided between the light source and the reaction system, and to carry out a stable photoreaction for a prolonged time to give a high quality oxime. The problem of the corrosion of the reaction tank can be advantageously solved.

Several embodiments of the method of this invention will be illustrated below by examples.

Example 1

In a metallic titanium-made photoreaction tank 1 of the type as shown in the accompanying drawing was placed 270 liters of cyclohexane, and a rod-like 10 kw. thallium lamp 2 equipped with a protecting tube 8 made of Pyrex glass (enclosed thallium iodide being 0.07 mg./cc.; enclosed mercury being 2.4 mg./cc.) was perpendicularly inserted as a light source into the center of the tank 1. The reaction tank was cooled externally (not shown) and the reaction liquor 6 was maintained at 10° C. From a gas-blowing tube 10, a gaseous mixture of nitrosyl chloride and hydrogen chloride (nitrosyl chloride being 10% by volume) was fed as a nitrosating agent into the reaction liquor at the rate of 360 liters per minute. Under this condition, it was possible to maintain the concentration of nitrosyl chloride in the reaction system at 0.4% by weight.

The numeral 3 shows a jacket of the light source, numeral 4 shows a plate regulating the path through which cooling water flows and numeral 9 shows an opening from which the reaction product is taken out. In order to cool the light source, a cooling water is poured from an inlet 5 and taken out from 7. Cyclohexane consumed in the reaction is fed continuously from a cyclohexane feeding tube 11 at a rate of 10 liters per hour. With the passage of reaction time, the yield of cyclohexanoneoxime decreased. When it decerased to 80% of that at the initial stage of reaction, the reaction was stopped. As a result, the reaction continued stably for 45 hours, and during the reaction, cyclohexanoneoxime was yielded in an amount of 2.85 kg. per hour on an average.

Example 2

The same procedures as in Example 1 were repeated except that cyclooctane was used as cycloalkane and a rod-like 10 kw. thallium lamp in which 0.09 mg./cc. of thallium iodide was enclosed was used. As a result, the stable time was 31 hours, during which average 3.8 kg. of cyclooctanoneoxime was formed every hour.

Example 3

The same procedures as in Example 1 were repeated except that as cycloalkane a mixture of cyclododecane and cyclohexane (in a weight proportion of 1 to 2) was used. As a result, the stable time was 15 hours, and there were obtained 13.9 kg. of cyclohexanoneoxime and 55.8 kg. of cyclododecanoneoxime.

Example 4

The same procedures as in Example 1 were repeated. The concentration of nitrosyl chloride in the reaction system was varied, and the changes of the yield of oxime (mol/kwh.) in response to the fluctuations of the concentration were compared in respect of the prior art processes in which a 10 kw. mercury lamp was used as a light source and the present invention in which a rod-like 10 kw. light source thallium lamp in which 0.07 mg./cc. thallium iodide was enclosed was used as a light source. Results are shown in Table 2.

TABLE 2

| Concentration of nitrosyl chloride in reaction system (percent by weight) | Yield of oxime per unit power (mol/kwh.) | |
|---|---|---|
| | Control (mercury lamp) | Example 4 (thallium lamp) |
| 0.05 | 1.6 | 1.9 |
| 0.10 | 1.9 | 2.3 |
| 0.15 | 2.0 | 2.6 |
| 0.20 | 1.9 | 2.8 |
| 0.25 | 1.8 | 2.9 |
| 0.30 | 1.7 | 2.9 |
| 0.50 | 1.5 | 2.9 |
| 0.80 | 1.2 | 2.7 |
| 1.00 | 0.7 | 2.3 |

It is clear from Table 2 that in accordance with the method of this invention, the yield of oxime per unit power is markedly improved and even at a higher concentration of nitrosyl chloride in the reaction system as compared with the prior art processes, the yield of oxime per unit power becomes greater. Moreover, in accordance with this invention, pronounced side reactions can be inhibited and the product can be obtained at a high purity.

Example 5

The same procedures as in Example 1 were repeated except that a thallium lamp having a different amount of thallium iodide was used. Results are shown in Table 3.

TABLE 3

| Thallium iodide to be enclosed (mg./c.c.) | Stable time (hour) | Yield of oxime per one hour of the stable time (kg./hr.) |
|---|---|---|
| 1.0 | 30 | 2.3 |
| 0.5 | 32 | 2.3 |
| 0.1 | 38 | 2.7 |
| 0.05 | 40 | 2.8 |
| 0.01 | 25 | 2.2 |

Example 6

The same procedures as in Example 1 were repeated except that a 10 kw. thallium lamp (containing 0.14 mg./cc. of thallium iodide, 0.014 mg./cc. of indium iodide, 2.2 mg./cc. of mercury) was used and the concentration of nitrosyl chloride in the reaction system was maintained at 0.5% by weight. The stable reaction time was 30 hours and the yield of oxime per hour was 2.6 kg. on an average.

Example 7

The same procedures as in Example 1 were repeated except that a 10 kw. thallium lamp (containing 0.04 mg./cc. of thallium iodide, 0.12 mg./cc. of sodium iodide, and 2.2 mg./cc. of mercury) was used. The stable reaction time was 36 hours, and an average yield of oxime per hour was 2.5 kg.

What is claimed is:

1. A method of photonitrosating a cycloalkane which comprises reacting said cycloalkane with a nitrosating agent under the irradiation of light from a thallium lamp in which a thallium halide is enclosed, said thallium lamp having a discharge tube including a sealed space containing about 1–.01 milligram of said thallium halide per cubic centimeter of said space, said nitrosating agent comprising a form of nitrosyl chloride, the concentration of nitrosyl chloride in the reaction system being 0.25 to 0.8% by weight.

2. The method defined in claim 1, wherein the quantity of thallium halide is 0.1–.05 milligram per cubic centimeter of said space.

3. The method defined in claim 2, wherein said thallium halide is iodide.

4. The method defined in claim 1, wherein said thallium halide is iodide.

References Cited

UNITED STATES PATENTS

| | | | |
|---|---|---|---|
| 3,309,298 | 3/1967 | Ito et al. | 204—162 |
| 3,129,155 | 4/1964 | Ito et al. | 204—162 |

HOWARD S. WILLIAMS, Primary Examiner